United States Patent [19]
Lorenzo et al.

[11] Patent Number: 5,519,717
[45] Date of Patent: May 21, 1996

[54] METHOD FOR TIME DRIFT REDUCTION OF FRQUENCY HOPPING NETWORK CLOCK

[75] Inventors: Gregory Lorenzo, Little Silver; Kenneth J. Loffer, Brick, both of N.J.

[73] Assignee: The United States of America as represented by the Secretary of the Army, Washington, D.C.

[21] Appl. No.: 295,338

[22] Filed: Aug. 24, 1994

[51] Int. Cl.⁶ .................................................. H04B 15/00
[52] U.S. Cl. ......................... 375/202; 375/356; 455/51.1
[58] Field of Search .................................... 375/202, 203, 375/205, 356; 455/51.1, 208, 257, 265

[56] References Cited

U.S. PATENT DOCUMENTS

| | | | |
|---|---|---|---|
| 4,677,617 | 6/1987 | O'Connor et al. | 375/202 |
| 5,121,408 | 6/1992 | Cai et al. | 375/202 |
| 5,394,433 | 2/1995 | Bantz et al. | 375/202 |
| 5,414,731 | 5/1995 | Antunes et al. | 375/202 |

Primary Examiner—Shephen Chin
Assistant Examiner—Timothy J. May
Attorney, Agent, or Firm—Michael Zelenka; William H. Anderson; James A. Digiorgio

[57] ABSTRACT

This invention provides a method for substantially reducing the time drift of a network clock in a frequency hopping communications system, without the need for a master unit to keep network time. The automatic network time tracking mechanism of each receiver is disabled when a network time update is received within a critical period of time from the closest synchronization update time or frequency hop time. The critical period is defined as the time between the closest synchronization update time to the local time when reception occurs less one-half the minimum tracking adjustment of the receiver plus the minimum processing or decoding delay, and that closest synchronization update time plus one half the minimum tracking adjustment of the receiver plus the maximum processing or decoding delay.

3 Claims, 4 Drawing Sheets

METHOD FOR TIME DRIFT REDUCTION OF FRQUENCY HOPPING NETWORK CLOCK

GOVERNMENT INTEREST

The invention described herein may be manufactured, used, and licensed by or for the Government of the United States of America for governmental services without the payment to us of any royalty thereon.

FIELD OF THE INVENTION

This invention relates generally to communications systems, and more specifically to network clock management of a frequency hopping, spread spectrum communication system.

BACKGROUND OF THE INVENTION

Presently, there is much activity in the development of spread spectrum communications systems in both the commercial and military arenas. A spread spectrum communication system is a system in which a plurality of communication units (radios) communicate with each other over a wide band of frequencies within a single communications channel. As a result, no one frequency is dedicated to any one communication network. This frees-up air-space so that a greater number of systems can use the limited number of available frequencies for communication over the air. Consequently, spread spectrum systems provide a more economical solution for over-the-air multiple access communications.

One technique for implementing spread spectrum communications is frequency hopping. In a frequency hopping system, the carrier frequency shifts from frequency to frequency in a predetermined pseudo-random pattern throughout the spectrum of the communication channel at a predetermined time based on the network clock. The network clock is established when the local clocks of all the units communicating on the channel are substantially synchronized to the same time. Without this local clock synchronization or network time, the units communicating on the channel will not hop to next frequency at the same time, and thus will lose communication with each other.

Essentially, frequency hopping acts as a time-frequency coding technique that provides a high degree of protection from frequency jamming as well as protection from eavesdropping on the communications channel. As a result, its success is directly dependant on the accuracy of the network timing. Since the network time is based on the local clocks of all the units communicating on the channel, it is not dependant or linked to the actual time of day.

One method of establishing and maintaining an accurate network time between the units communicating on the channel is disclosed in Pat. No. 5,121,408, entitled "Synchronization For Entry To A Network In A Frequency Hopping Communication System," issued Jun. 9, 1992, to Cai et al, and incorporated herein by reference. Cai et al discloses a synchronization arrangement in which each unit on the network is initially synchronized to the same time or initial network time. As communications take place, each unit continually tracks its local clock deviation from that of the network time, making any corrections necessary to maintain synchronicity between its local clock and the network clock. This synchronization process, which is inherent to all present day FH communications systems, is crucial to maintaining communications with the network.

Some frequency hopping systems initially set the network time to the actual time of day by preloading each unit intending to communicate on the channel with that time. The units on such a system usually have a built-in network time correction or update procedure that keeps its local clock in sync with the local clock of all the other units on the network. The network time update or correction to each local clock is usually done at the beginning of every transmission.

Basically, when a unit starts to transmit, it sends its local clock time to all the other receiving units. The receiving units, in turn, compare this time to their own local clock time. If there is a difference between the two times, the receiving unit calculates a tracking adjustment time by which it changes its local clock time to be as close to the transmitted time as possible. Thus, it can be seen that the tracking adjustments are only as accurate as the tracking adjustment time calculated by the receiver. Moreover, since the transmitting unit dictates the update time, it also dictates network time during its transmission. As a result, many clock or network time corrections may occur during extended communications involving many transmissions, and thus result in a network time drift away from the real time of day.

This network time drift is not detrimental to those units that maintain constant communications with the network because they will always hop to the correct frequency at the same time as all the other network units that have similarly drifted with the network clock. The network time drift, however, will adversely affect those units that lose communication with the network as well as those units wishing to establish communication with the network after the network has drifted some critical amount of time. This critical time is a function of the accuracy of the network time correction function or minimum adjustment time of each unit, and essentially indicates how far a local clock can drift from the network clock before resynchronization becomes impossible. Thus, each communications system has a different critical time outside which a remote unit can not drift if it wants to maintain communications with the network.

This network time drift phenomenon has been observed in the United States Army's Single Channel Ground and Airborne Radio System (SINCGARS). In SINCGARS, it has been observed that the network clock loses time relative to real time at a rate whose probability is proportional to the rate of transmissions between the units on the communications channel. As a result, after extensive transmissions between units which are synchronized with the network clock, it is difficult for a late coming subscriber or a subscriber who loses communications with the SINCGARS network to join the network and synchronize its local clock with the drifting network clock. The network operator has to use additional late network entry procedures, and thus is delayed in joining or rejoining the network.

Moreover, a problem arises when the transmitting unit begins its transmission just before a new frequency hop. When this happens there is a large probability that all the receiving units will decode the network clock information, sent by that transmitting unit, during the following network time slot. As a result, all the receiving units will think they are in the wrong time slot and thus adjust their local clocks backward to the preceding time slot. Thus, the entire network time or network clock will drift back one unit of time or one frequency hop.

It can thus be easily seen that over extended communications the network time will be pulled backwards by these local time adjustments before each transmission. This adjustment time is called the tracking adjustment time. Consequently, the critical parameter for each unit is its minimum tracking adjustment time. This is the minimum amount of time a network unit can adjust its local clock to be in line with the network time as dictated by the current transmitting unit. As a result, the minimum tracking adjustment time dictates the network clocks accuracy and drift amount during extended communications having many transmissions.

To reiterate, if this minimal tracking adjustment time is large enough to change the network clock to the preceding time slot or preceding frequency hop, then the network will essentially drift backwards with respect to real time. As described above, this will hinder those units that lose communications with the network and those units that later wish to join the network from joining or rejoining the network.

As demonstrated in the SINCGARS system, the most common method of reducing the probability of network time drift, due to these minimal adjustments, is to maintain a "master" unit on the network to independently keep the network clock. The master unit periodically transmits the network time so that each unit can maintain synchronization between its local clock and that of all the other units on the network without having to resynchronize during each transmission.

Using a master unit, however, presents many problems in the field. For one, if anything happens to the master unit such that it can not maintain communications with the other network units, the network clock will drift as described above. Secondly, the constant transmission of network time information from the master unit will reduce the efficiency or throughput of the communications channel. Lastly, not all spread spectrum communication systems that utilize the frequency hopping technique have the option of using a master unit for network timekeeping.

SUMMARY OF THE INVENTION

Accordingly, the present invention provides a method for substantially reducing the network time drift of frequency hopping communication systems, without the need for a master unit to keep network time. To attain this, the present invention contemplates disabling the network unit's automatic time tracking mechanism when the network synchronization update time is received within a critical period of time from the closest synchronization update time or frequency hop time of the local clock of the unit communicating on the system.

For example, in the SINCGARS frequency hopping system, when a unit initiates a communication period (i.e. a period of time during which all the units have an opportunity to communicate with each other) on the system, the initiating unit sends its local clock information to the other remote units on the system to communicate the frequency hop or synchronization update time of its own local clock. This establishes the clock of the initiating unit as the network clock for that communication period. As a result, the remote units can periodically adjust their local clocks so that the synchronization update time of their local clock is in-line or synchronous with the synchronization update time of the network clock. These periodic adjustments are called tracking adjustments.

According to the inventive method described herein, any local clock drift due to tracking adjustment overcompensation can be substantially eliminated by disabling or zeroizing the tracking adjustment when the network synchronization update time is within some critical time window from the closest synchronization update time of the receiving unit's local clock. More specifically, the present inventive method zeroizes any potential adjustments to the local clock for receptions occurring between the closest synchronization update time less one-half the minimum tracking adjustment of the receiving unit plus the minimum processing or decoding delay, and the closest synchronization update time plus one-half the minimum tracking adjustment of the receiver plus the maximum processing or decoding delay of the receiver.

This means that when the synchronization update time of the local unit is within some critical minimum time from the network synchronization update time, the unit does not adjust its local clock. Rather, the unit waits until it detects that the local clock synchronization time drifts out of the critical window, thus eliminating the need for a master clock and insuring that the local clock time is not overcompensated or unnecessarily adjusted for any detected drift. Thus, overcoming to a large extent the limitations of the prior art.

These and other features of the invention are described in more complete detail in the following description of the preferred embodiment when taken with the drawings. The scope of the invention, however, is limited only by the claims appended hereto.

DETAILED DESCRIPTION OF THE INVENTION

Figure 1:
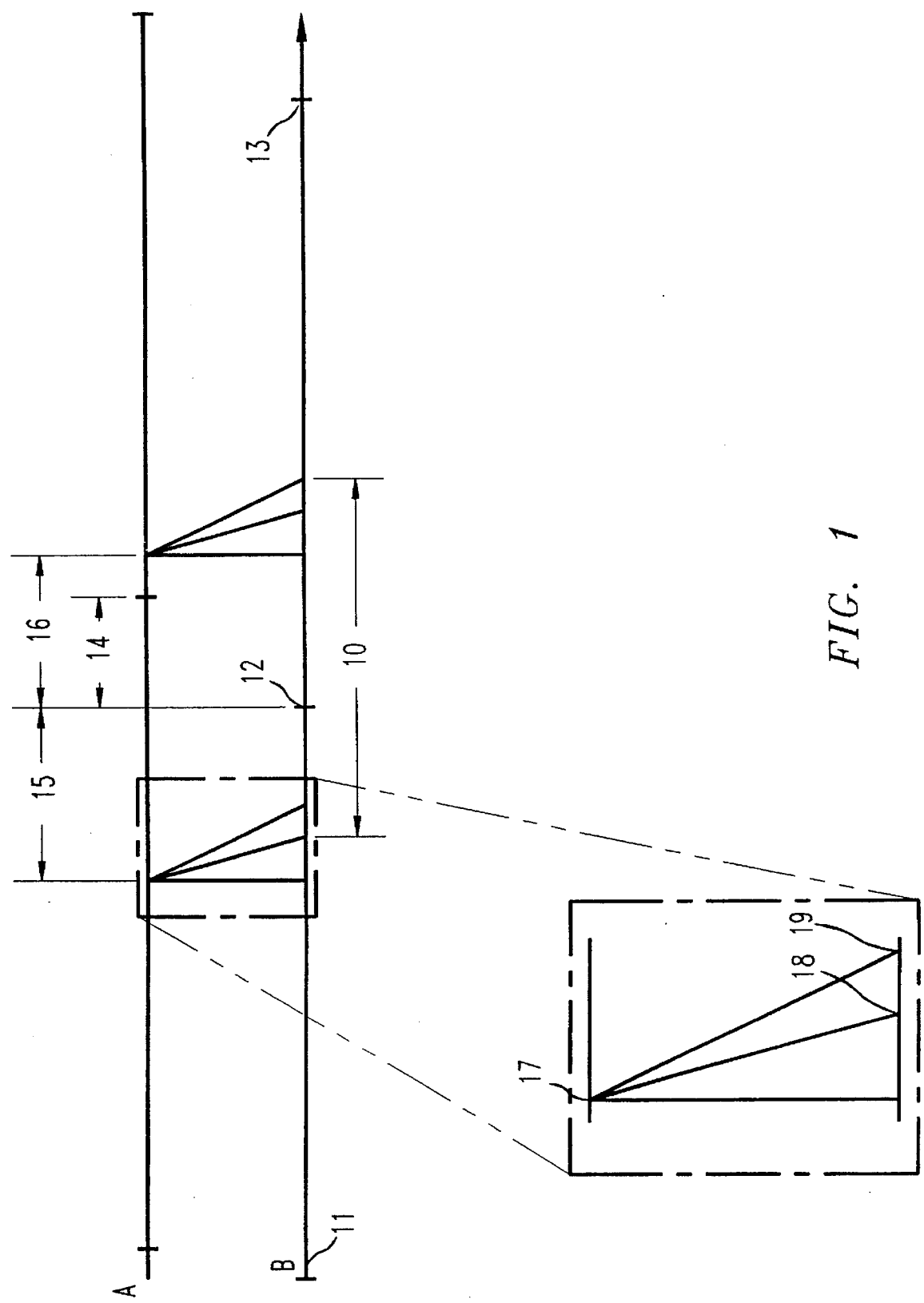
FIG. 1 is a timing diagram view of the critical parameters involved in making the proper timing adjustments for a preferred embodiment.

Referring now to the drawings, there is shown in FIG. 1 a timing diagram of a preferred embodiment of the invention which is based on the United States Army's SINCGARS frequency hopping communications system. The timing diagram illustrates the relationship of the physical characteristics of the SINCGARS frequency hopping system over time, and thus illustrates the physical characteristics to which the inventive method is applied.

As shown, initiating or transmitting radio A starts to transmit to all the other radios on the network at transmission time 17. This transmission is preceded with receiving radio B's local clock time at time 17. Thus, receiving radio B receives and decodes the transmitting radio A's local clock time information at a time between the smallest possible decoding delay time 18 and largest possible decoding delay time 19, later. At the time the receiving radio B actually decodes the transmitting radio A's local clock, it reads its own local clock time, and compares the two.

From this comparison the receiving unit B determines if it must make an adjustment or tracking adjustment (not shown) to its local clock time so that its synchronization update time is in-line with transmitting unit A's local clock synchronization update time which is now the network synchronization update time for all units on the system. One-half the minimum positive tracking adjustment 16 and one-half the minimum negative tracking adjustment 15 are shown centered around the closest synchronization update time 12. The minimum positive and negative adjustment time for each unit is the smallest time increment by which a unit can adjust its local clock time. As known in the art, this is directly dependant on the resolution of the local clock and the software driving the operation of the local unit, and thus can be predetermined therefrom. Synchronization update times 11, 12 and 13 are basically the critical times at which the network hops to the next frequency.

Thus, to insure that all system units hop to the next frequency at the same time, each unit must make accurate and necessary tracking adjustments to its local clock so that its synchronization update time is substantially at the same time as the network synchronization update time set by each unit initiating a communication period on the system.

It can be easily seen, however, that the decoding delay time can cause receiving radio B to think it is in the wrong synchronization time slot. For example, if transmitting radio A sends its local clock information at a time just before synchronization update time 12, the decoding delay time 18 and 19 may cause receiving radio B to think it is in the wrong time slot and thus make a negative tracking adjustment to its local clock. Thus, to eliminate tracking adjustment errors the inventive method zeroizes or disables the tracking adjustment when the receiving unit decodes the transmitting unit's signal within critical time window 10. For example, if the received timing signal is decoded at time 14 within critical window 10, then no tracking adjustment is made to the local clock of the receiving unit.

Critical time window 10 is basically determined from the receiving unit's time accuracy or truncation, and its decoding time. More specifically, the critical time window is the time between the closest synchronization update time 12 minus one-half the minimum negative tracking adjustment time 15 plus the minimum decoding time 18, and the closest synchronization update time 12 plus one-half the minimum positive tracking adjustment time 16 plus the maximum decoding delay 19. The tracking adjustment time is system dependent and direct related to the minimum amount of time the local clock can be adjusted. For example, the minimum tracking adjustment time for a unit communicating on a frequency hopping system may be one second. As discussed above, the synchronization update time is the time when communications on the system switches to the next frequency.

Figure 2:
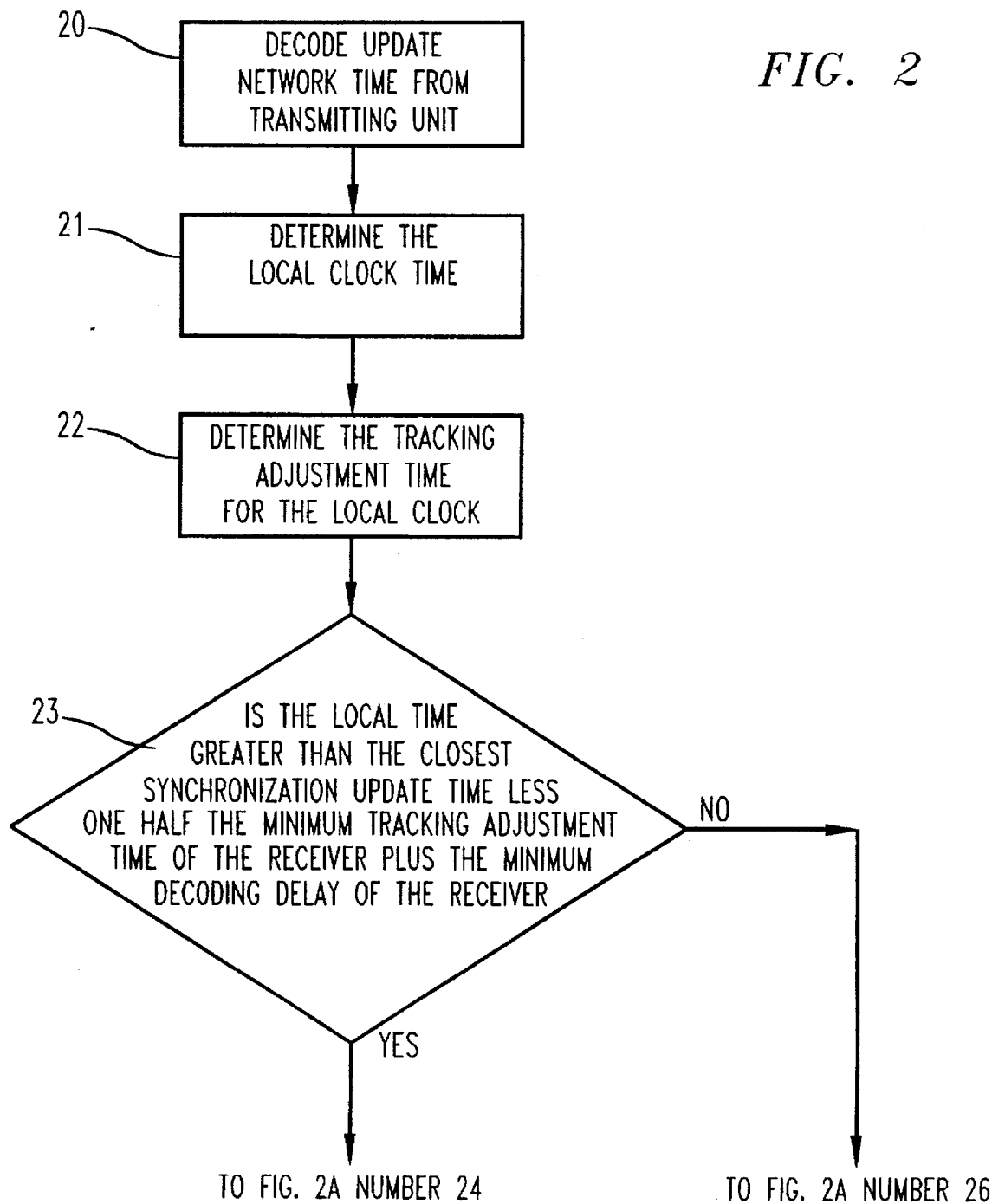
FIGS. 2 and 2a are flow charts of the steps of the inventive method described herein.
Figure 2A:
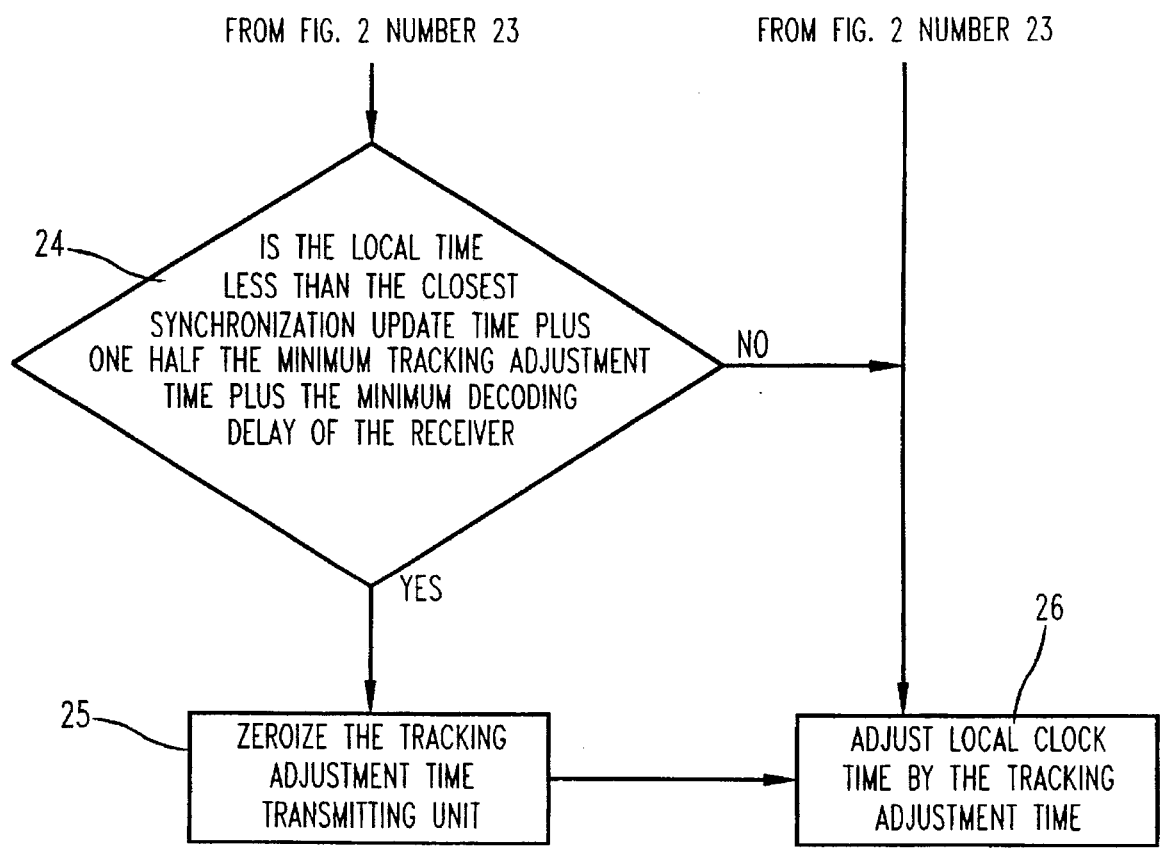

The steps of the inventive method are shown in FIG. 2. As shown, the receiving unit decodes the transmitting unit's network update time, step 20, and determines how far its local clock is from that update time, step 21. In comparing the network update time to the local time, the receiving unit calculates an actual tracking adjustment time to make the local clock as close to the network update time as possible, step 22. If the local time is within the critical window 10, as shown at point 14 in FIG. 1, then the tracking adjustment time is zeroized, steps 23, 24 and 25. Finally, the receiving unit adjusts its local clock by the tracking adjustment time, step 26.

Figure 3:
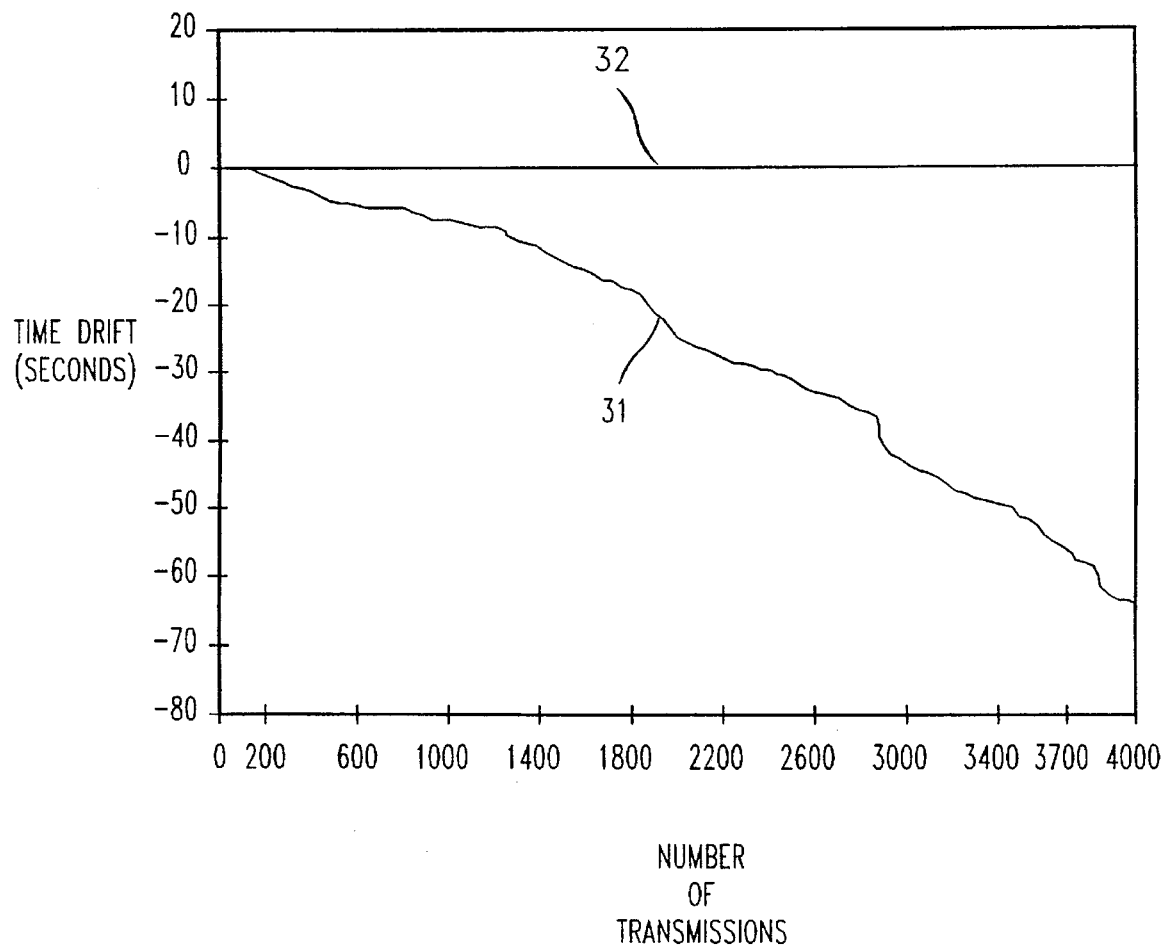
FIG. 3 is a graphical view of the improvement and reduction of network time drift of the SINCGARS frequency hopping system when incorporating the inventive method described herein.

FIG. 3 shows a graphical view of the overall improvement in network time drift when the inventive method is implemented in such a frequency hopping communications system. As shown, a unit implementing the inventive process experiences virtually no drift 32 over 4000 transmission whereas the prior art shows a steady drift 31 as the number of transmissions goes up.

What is claimed is:

1. A method for reducing the local clock time drift of a unit communicating on a frequency-hopping communication system, the system having a plurality of units communicating thereon, a network time set to the clock of a remote unit initiating a communication period on the system, the network time including a periodic synchronization update time to indicate the time when the communication system switches frequency, each unit on the system having a local clock, a local periodic synchronization update time, a minimum tracking adjustment time indicating the smallest time increment by which its local clock is adjusted, and a decoding delay time indicating the time between a transmission on the system and a reception and decoding of the transmission by a unit on the system, comprising the steps of:

a. receiving the most recent network synchronization update time from a remote unit initiating a communication period on the system;

b. calculating the amount of time between the network synchronization update time and the nearest synchronization update time of the receiving unit's local clock to determine a local clock tracking adjustment time;

c. setting said local clock tracking adjustment time to zero, if the tracking adjustment time is less than one-half a predetermined minimum tracking adjustment time for the system plus a predetermined maximum decoding delay of the local unit, and greater than a predetermined minimum decoding time less one-half said minimum tracking adjustment time;

d. adjusting the local clock by said tracking adjustment time to substantially align the local clock synchronization update time with the network synchronization update time; and e. repeating steps a through d until the remote unit terminates said communication period on the system.

2. The method of claim 1 wherein the frequency hopping communications system is the United States Single Channel Ground and Airborne Radio System.

3. The method of claim 2 wherein the minimum tracking adjustment time is 0.5 seconds.

\* \* \* \* \*